United States Patent [19]

Alcantara Perez et al.

[11] Patent Number: 4,761,657
[45] Date of Patent: Aug. 2, 1988

[54] METHOD FOR FEEDING A DRAWING MEDIUM SUCH AS PAPER IN A DRAWING PLOTTER

[76] Inventors: Bernardo Alcantara Perez, C/Rioja nr. 13-4-B, Madrid (28042); Rodrigo Becerra Carrasco, C/Urbanizacion nr. 109 Villas F-17 Pozuelo Estacion, Madrid (28023); Pedro Panizo Robles, nr. 22 Pozuelo de Alarcon, Madrid (28023), all of Spain

[21] Appl. No.: 77,584

[22] Filed: Jul. 24, 1987

[30] Foreign Application Priority Data

Jul. 24, 1986 [ES] Spain .................................. 8600543

[51] Int. Cl.⁴ .......................................... G01D 15/24
[52] U.S. Cl. .................................... 346/1.1; 346/136
[58] Field of Search ............. 346/1.1, 136, 108, 139 R

[56] References Cited

U.S. PATENT DOCUMENTS 3,943,530 3/1976 Mourier ............................... 346/136
4,477,822 10/1984 Luoma ................................. 346/136
4,560,995 12/1985 Suga .................................... 346/136

*Primary Examiner*—E. A. Goldberg
*Assistant Examiner*—Mark Reinhart
*Attorney, Agent, or Firm*—Kenyon & Kenyon

[57] ABSTRACT

In a flat table drawing plotter, an image is drawn on the portion of a continuous work piece, e.g., a sheet of paper, located on a drawing table. Upon completion of the drawing of the image, a trace line is drawn at the rear end location of the image. The drawing carriage, having an optical detector means mounted thereon, is moved to the forward end of the table. The work piece is advanced with the optical detector means in continuous contact therewith. The advance of the work piece is stopped when the optical detector means detects the trace line. Then, the drawing carriage is slowly moved until the optical detector means again detects the trace line thereby identifying where the prior drawing of the image was completed. Drawing of the image is then recommenced.

6 Claims, 4 Drawing Sheets

METHOD FOR FEEDING A DRAWING MEDIUM SUCH AS PAPER IN A DRAWING PLOTTER

FIELD OF THE INVENTION

This invention relates to drawing machines, also known as plotters, which are used, e.g., as information output terminals in computer-assisted design equipment. More particularly, the present invention is directed to a method for feeding a drawing medium such as paper in a drawing plotter.

The machine which is particularly described herein is especially suitable for use in the clothing industry or similar uses having like characteristics as to the type of work pieces used, the accuracy required, the density of lines per unit of area drawn, etc., which make necessary a cheap drawing medium, since large amounts of the drawing medium are employed.

In this type of industry, it is also necessary to make patterns which are used as production control elements. Such patterns are made of materials which are more resistant than paper, e.g., cardboard or plastic. The preparation of these patterns is also described herein.

BACKGROUND OF THE INVENTION

The drawing plotter described herein is related to that described in Spanish Pat. No. 550,267 entitled "Automatic Plastic Drawing and Ruling Machine". The operating principles of drawing plotters, in their two basic versions, drum and flat types, and including some mixed models, are well-known. Also well-known are the advantages and disadvantages of one type of technology compared with the other. See, e.g. French Patent Application No. 7516659 in the name of Uri Leder of Computer Products Inc., a California corporation.

Nevertheless, the application of this technology to the clothing industry means that existing plotters are not usable, for a variety of reasons, such as the high costs of large plotters developed for the aeronautical and automobile industries, or those used to mark with high flatness precision on the table, or those of the purely dimensional type for use in technical offices.

The drum plotter which is the subject of Spanish Pat. No. 509082 was designed in particular for this industry which makes it possible to handle rolls of paper of up to 150 m, but which has the disadvantage that it requires perforated paper.

Likewise, until now, machines for the preparation of the patterns have been proposed which are separate from those for the drawing, and which use a laser or blade as a cutting tool. This requires special support surfaces, using a vacuum as the securing element. This results in pattern production being expensive.

OBJECTS OF THE INVENTION

The object of the present invention is to provide a method for the control of the paper feed in a flat drawing plotter, which is inexpensive and has a high level of operational reliability. These and other objects of the present invention will become apparent from the following description and claims in conjunction with the drawings.

SUMMARY OF THE INVENTION

The present invention is directed to a method for feeding a continuous sheet-like work piece, such as paper, in a flat table plotter apparatus. The flat table plotter apparatus has a drawing table, work piece supply means located at a first end of the drawing table, work piece collection means located at a second opposite end of the drawing table, feed means for feeding the work piece in a feed direction from the first end to the second end of said drawing table, and drawing means located above the drawing table. The method comprises placing the work piece on the drawing table, and drawing an image on the work piece, with image thereby having a first end adjacent the first end of the drawing table. A trace is then placed on the work piece at the first end of the image, and then the work piece is advanced in the feed direction. The trace is optically detected when the work piece has advanced a preselected distance in the feed direction, suitably when the first end of the image approaches the second end of the drawing table. The advance of the work piece is stopped responsive to the optical detection of the trace. After the advance of the work piece has stopped, and the trace is again optically detected thereby locating said first end of said image, and drawing of the image is recommenced responsive to the optically detected location of the first end of the image.

The trace is suitably a line perpendicular to the feed direction, and advantageously two closely adjacent parallel lines perpendicular to the feed direction.

In preferred embodiments, the drawing means includes a drawing carriage having a drawing tool and optical detector means mounted thereon. The drawing tool places the trace line or lines on the work piece after the image is drawn. The drawing carriage is then moved to a location adjacent the second end of the drawing table and the optical detector means contacts the advancing work piece to optically detect the trace on the advancing work piece. After the stopping of the advancing work piece responsive to the optical detection of the trace, the drawing carriage along with the optical detector means in continuous contact with the work piece is slowly moved toward the second end of the drawing table to again optically detect the trace. The movement of the drawing carriage is stopped when the trace is again optically detected, this being the location of the first end of the previously drawn image.

In accordance with one embodiment of the present invention, a reduction motor rolls up the paper which has passed through the drawing zone of a drawing plotter. An optical line reader is fitted in the drawing head or carriage and reads a trace made by the drawing tool at the end of the drawing in one window. When this trace is detected by the optical line reader, a stop order is sent to the roller reduction motor. Then, after the paper feed has stopped, in order to make a joint exactly and continue with the drawing of the following window in the correct and aligned manner, the optical line reader makes a search for the trace at very low speed. When the line has been found, the plotter continues the drawing operation at the correct position.

BRIEF DESCRIPTION OF THE DRAWINGS

In the drawings forming part hereof.

DETAILED DESCRIPTION

In order to provide a more complete understanding of the method of the present invention and an appreciation of its advantages, the method of the present invention will be described in conjunction with a specific drawing plotter. It will be appreciated that the method of the present invention, as defined in the claims, may be practiced with a large variety of drawing plotters with various constructions.

Figure 1:
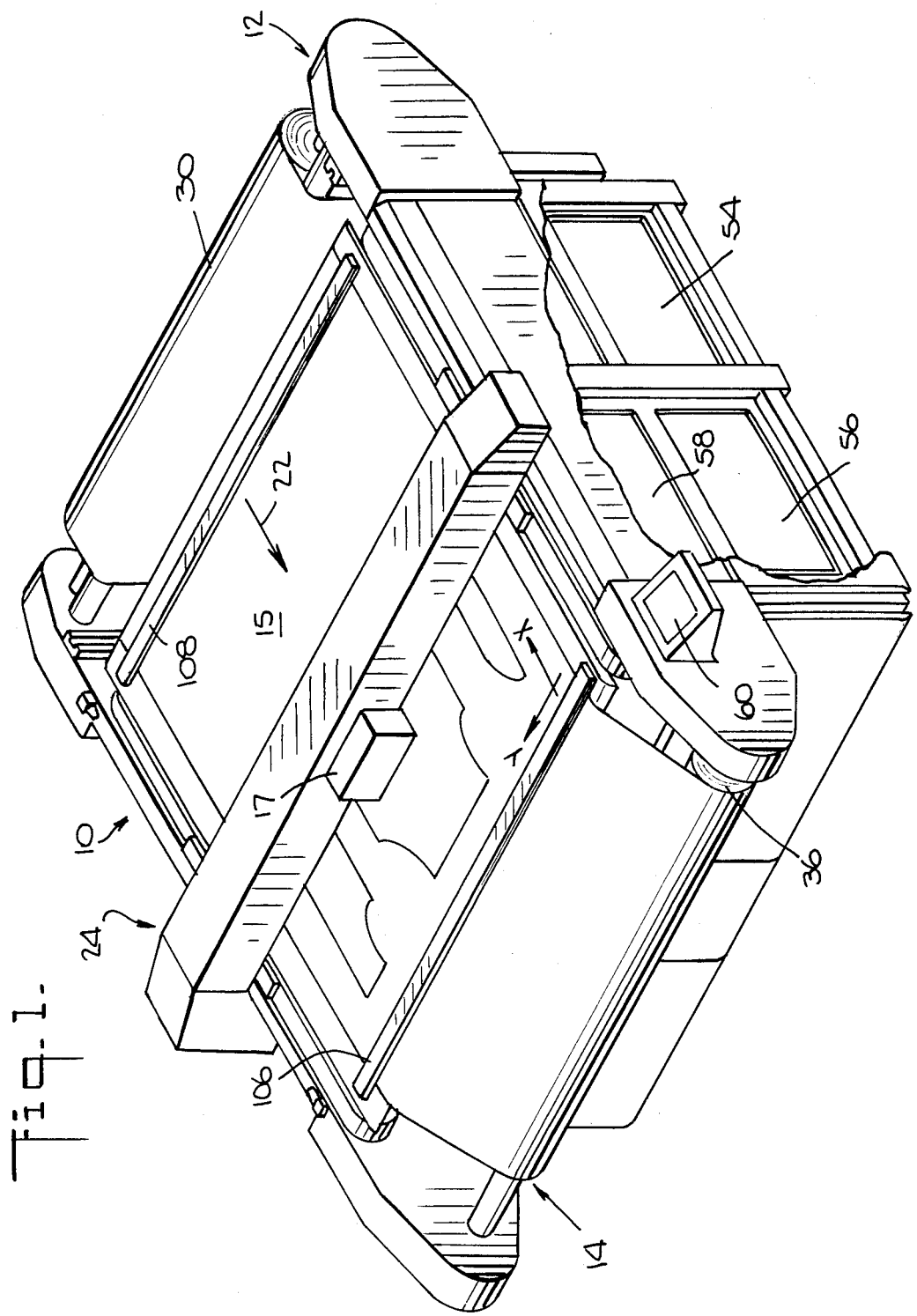
FIG. 1 is a perspective view of one embodiment of an apparatus for practicing the method of the present invention.

FIG. 1 is a schematic view of a drawing plotter showing the drawing zone 10, the power supply unit 12 and the collection assembly 14. The drawing zone 10 is, basically, a table, over which a drawing medium such as paper 15 is extended and on which the drawing operation is to be carried out. The drawing tool carriage 17, supported by the X-Y assembly 24, is able to move over the entire surface of the table.

Figure 2:
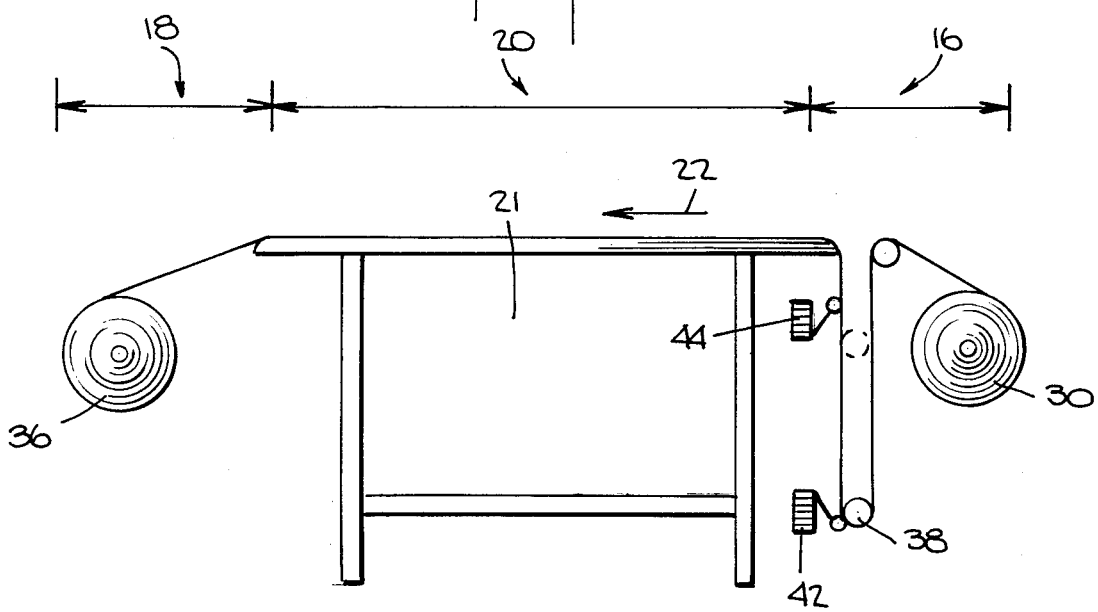
FIG. 2 is a schematic representation of paper positions in a drawing plotter.
Figure 3:
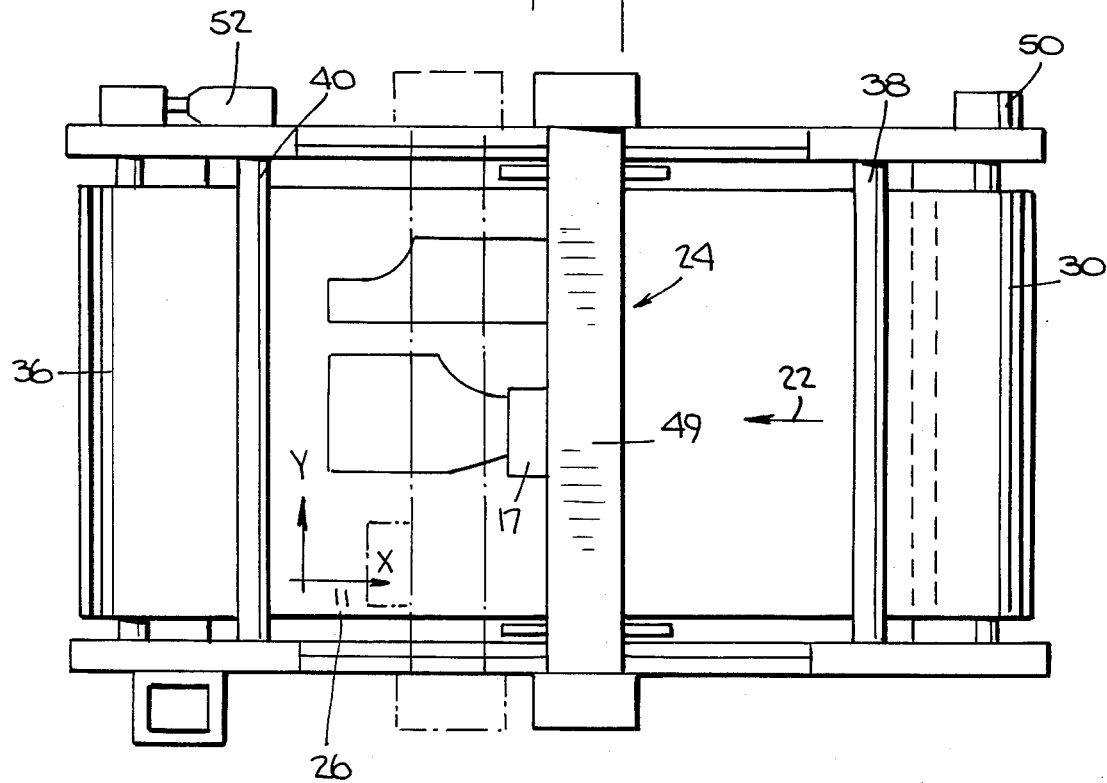
FIG. 3 is a schematic ground plan view of the drawing plotter of FIG. 1.

FIG. 2 shows, in diagrammatic form, a side view of the drawing plotter with the feed zone 16 associated with the supply unit 12, the collection zone 18 associated with the collection assembly 14, and the drawing zone 20 with the table 21. Here, the feed paper roll 30 and the collection roll 36 can be seen, with the idler in the feed zone 38 and the stroke limiters 42, 44 in the feed zone. This same zone contains the brake 50, seen in FIG. 3, which prevents the reel 30 from racing under the influence of the idler 38 and releasing the paper uncontrollably. In the collection zone is the reduction motor 52 which is responsible for gathering up the paper, as necessary, in accordance with instructions received from the controller, when the optical detector fitted on the drawing tool carriage 17 detects a line drawn for this purpose. This will hereinafter be explained in detail. FIGS. 1, 2 and 3 show the direction of feed of the paper with the arrow marked 22. Under the table 21 in the drawing zone 20, a controller for the machine is installed. The controller is divided into the modules for feed sources 54, control 56 and servo and power units 58. The controller is connected to the exterior by means of an I/0 standardized data line and the control panel 60. Controllers for X-Y drawing plotters are well known and widely used in the art and thus are not described in detail herein.

Figure 4:
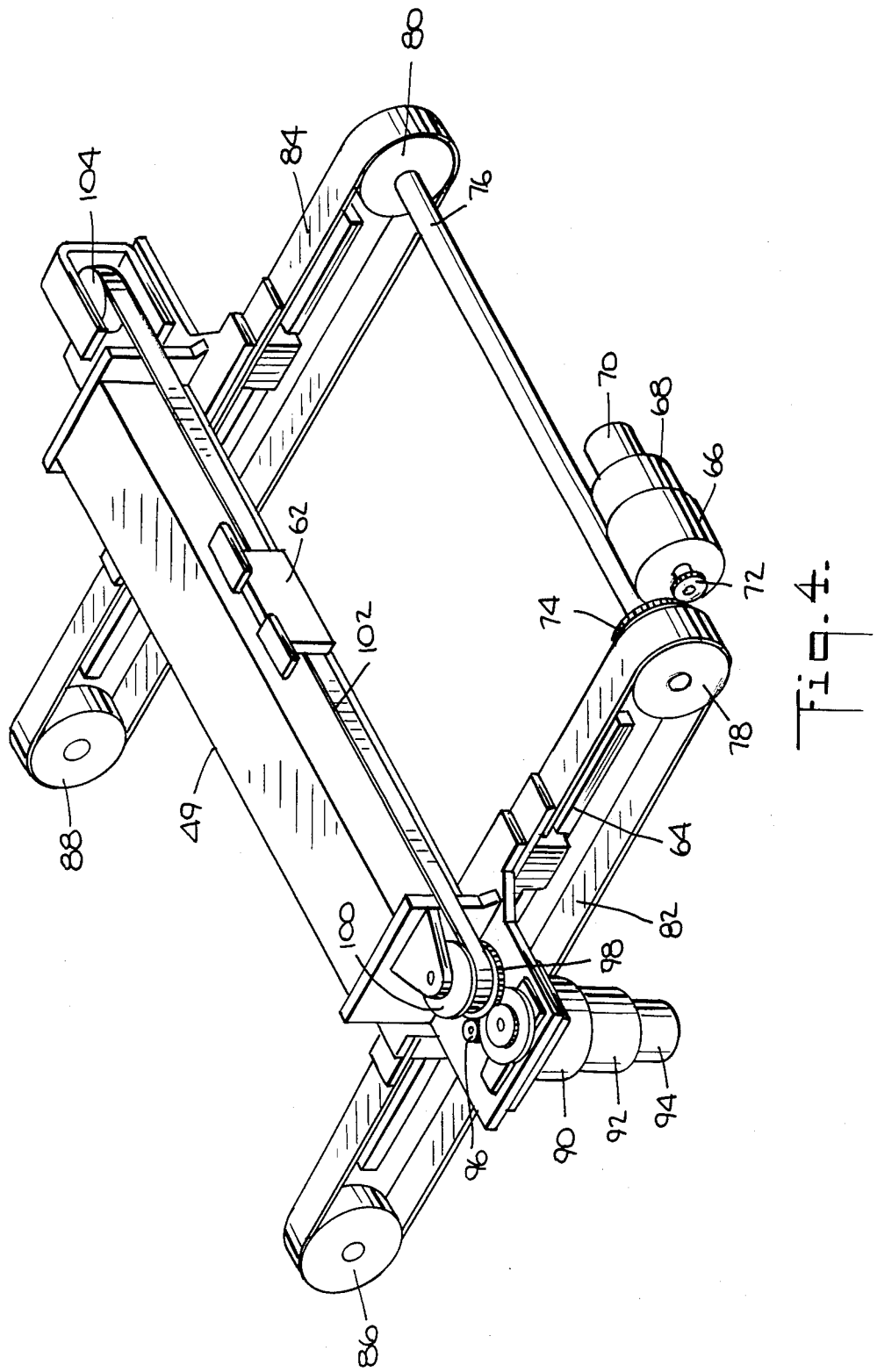
FIG. 4 is a perspective view of the drive of the X and Y axes of the drawing plotter.

As has already been mentioned, the drawing tool carriage 17 which is fitted on the X-Y assembly 24, moves in the drawing zone 20 over the surface of the table 21. As can be seen in detail in FIG. 4, the X-Y assembly is made up of an X carriage 49 and a Y carriage 62. The former is sited at right angles to the guides 64 placed on either side of the table and parallel to the direction X, so that the Y carriage, which moves on guides fitted along the X carriage 49, moves in direction Y in an orthogonal system of coordinate axes. Both axes move in accordance with the same principle so only the X axis will be described in detail. The motor 66 is driving with a reduction gear 72–74 the shaft 76 which run across the drawing table from one side to the other. At both ends of the shaft are the toothed pulleys 78 and 80 around which run belts 82 and 84 which are held under tension by the tensor pulleys 86 and 88. Carriage 49 is driven by the belts 82 and 84 to which it is fitted. The following elements are fitted on the X carriage 49: the Y motor 90, the tachometer 92, the transducer 93, the gears 96 and 98, the drive pulley 100, belt 102 and the tensor pulley 104 for the movement of the Y carriage 62. In this way, under the action of the command signal sent to the motor 66 from the servo/power module 58 of the controller, the drawing tool carriage 17 is able to move, together with the X carriage 49 in its forward movement and its backward movement and, likewise, parallel to the direction X. In the same way, the motor 90 moves the drawing tool carriage 17 along the X carriage 49, backwards and forwards (i.e. a movement at right angles to the previous one) so that, with a combination of both of these, it is possible to draw any figure on the X-Y plane.

The method of the present invention involves the movement and control of the paper feed for the correct connection of the drawings in two successive windows. Usually, the panels to be drawn, or groups of these, are larger than the useful drawing area, so that this machine makes it possible to move the paper forward at a pre-set distance to be called "window width" which means that the real useful length of the drawing will be limited only by the size of the reel of paper placed on the feed end. Thus, when the controller has delivered all the information which can be drawn in the window in the drawing zone at that time, and the drawing plotter has completed the drawing in the window, preferably two traces 26 are drawn which are just a small distance apart, parallel to the Y axis of the machine, and in an area which is adjacent to the one where the drawing has been completed. The controller immediately sends several simultaneous commands (FIG. 3): to the X carriage 49 which moves at maximum speed to a point to the left of the window, to the drawing tool carriage 17 which moves to an ordinate such that the tip of the optical detector 121 in FIG. 7 fitted on the carriage 17 can detect the traces 26 drawn previously, and, finally, to the reduction motor 52, to start it up and feed the paper. Once the drawing tool carriage 17 is in position (see the trace line in FIG. 3), a command is sent to the optical detector 121 to drop until its tip is in contact with the paper.

As soon as the optical pen 121 sees the trace lines 26 pass, the controller orders the reduction motor 52 to stop. Because of the inertia, this does not occur instantaneously but, moreover, because of the increase in radius of the collector reel 36, the distance travelled by the lines 26 after they passed under the optical detector, and until the paper stops, varies continuously. Thus, once the paper has stopped, the optical line detector light pen 121 begins to look for the position where the lines 26 stopped. For this, the X carriage assembly 49 moves slowly in the negative direction X (FIG. 3), and when it finds them once more, the controller orders the assembly 40 to stop immediately. As the position of the lines 26 is the reference for where drawing was left off, the drawing process can continue with the drawing lines which were interrupted perfectly join up with the new drawing lines.

During this process (FIG. 2), the idler 38 on the feed end rises, supplying the paper from the loop which it forms. As soon as it leaves the stroke limiter 42, the controller sends the brake 30 an intermittent on-off signal so that, because of the weight of the idler 38, the roll of paper 30 begins to turn anti-clockwise, thereby feeding the paper to the loop which is formed by the idler. Because of the high level of inertia of the roll of paper, this movement is slower than the one caused by the bridge's dragging of the paper, and the idler 38 rises, although not so far as to come into contact with the stroke limiter 44, which would stop the machine. On the other hand, the on-off signal to the brake prevents the feed paper roll 30 from acquiring considerable speed, so that the size of the brake that is used is considerably reduced. Emphasis must be made here on the "isolating" effect of the feed roll 30, which has a high level of inertia, as opposed to the feed of the paper by the carriage 49, since all that has to be moved is the small inertia of the idler 38.

The feed is stopped when the idler 38 comes into contact with the stroke limiter 42 which interrupts the on-off signal to the brake so that the brake comes off, as, in these conditions, does that for the movement of the reel 30.

In order to prevent any unwanted movement of the paper while the drawing process is going on, on both sides of the drawing zone are bars 106, 108 for fixing the paper on the electromagnets 110 and 112 which raise the bar when the paper is to be fed through.

Figure 6:
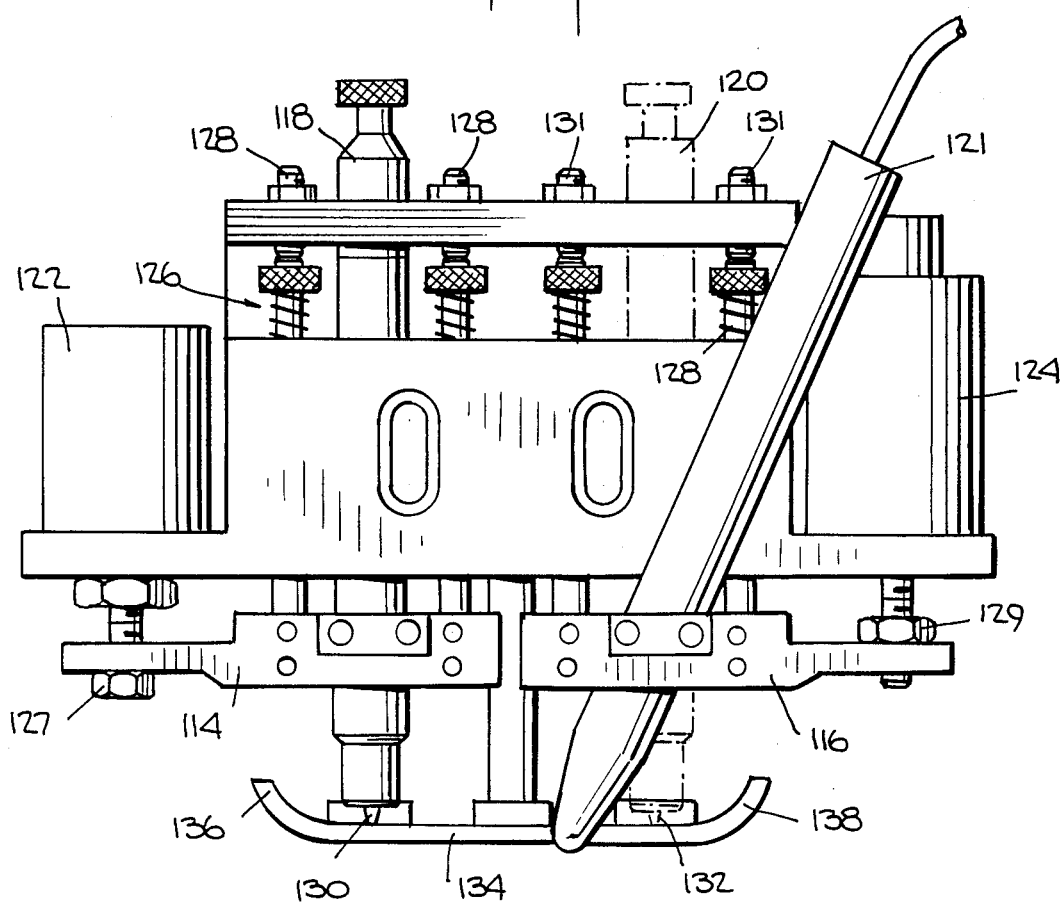
FIG. 6 is a view of a tool for drawing on and lining plastic for patterns and the assembly of the optical detector.

The drawing tool carriage 17 is shown in greater detail in FIG. 6. Essentially, it comprises two small carriages 114, 116 with a vertical movement. The drawing tool itself is mounted on one of these carriages 118. Normally, for this type of machine, it has a large capacity. On the other small carriage is the tool for ruling plastic 120 for the preparation of the patterns (drawn in phantom lines). Each of the small carriages is operated by electromagnets 122, 124 with withdrawals under the action of springs 126, 128. The stroke is adjusted by means of screws 127 and 129, and 128 and 131. It may be that the edges of the paper are not firmly secured on the table in the area of carriage 49. To prevent the tip 130 of the pen 118 or of the plastic ruling tool 132 from buckling when either of them returns to the paper from outside the edges, the bottom of the tool has a skid 134 with forms 136 and 138. Likewise, as can be seen from FIG. 6, on the small carriage 116, as an alternative to the ruling tool, an optical line reader such as a light pen 121 can be fitted, since the drawing and plastic ruling operations are mutually exclusive.

Although preferred embodiments of the present invention have been described in detail, it will be appreciated that modifications may be made by one skilled in the art all within the spirit and scope of the present invention as defined in the claims. It will also be understood that the method of the present invention, as defined in the claims, is not limited by the apparatus in conjunction with which it has been described.

What is claimed is:

1. A method for feeding a continuous sheet-like work piece in a flat table drawing plotter, said flat table drawing plotter having a drawing table, work piece supply means located at a first end of said drawing table, work piece collection means located at a second opposite end of said drawing table, feed means for feeding said work piece in a feed direction from said first end to said second end of said drawing table, and drawing means located above said drawing table, said method comprising:
   positioning said work piece on said drawing table;
   drawing an image on said work piece, said image having a first end adjacent said first end of said drawing table;
   placing a trace on said work piece at said first end of said image;
   advancing said work piece in said feed direction;
   optically detecting said trace when said work piece has advanced a preselected distance in said feed direction;
   stopping the advance of said work piece responsive to the optical detection of said trace;
   optically detecting said trace after the advance of said work piece has stopped, thereby locating said first end of said image;
   and recommencing drawing said image responsive to said optically detected location of said first end of said image.

2. A method according to claim 1 wherein said trace is a line perpendicular to said feed direction.

3. A method according to claim 1 wherein said trace is two closely adjacent parallel lines perpendicular to said feed direction.

4. A method according to claim 1 wherein said drawing means includes a drawing carriage with a drawing tool and optical detector means mounted on said drawing carriage, said method further comprising:
   placing said trace on said work piece in the form of a line using said drawing tool;
   moving said drawing carriage to a location adjacent said second end of said drawing table;
   contacting said advancing work piece with said optical detector means to optically detect said trace on said advancing work piece;
   after stopping said advancing work piece responsive to said optical detection of said trace, slowly moving said drawing carriage with said optical detector means in continuous contact with said work piece to again optically detect said trace; and
   stopping movement of said drawing carriage when said trace is again optically detected, thereby locating said first end of said image.

5. A method according to claim 4 wherein said trace is two closely adjacent parallel lines perpendicular to said feed direction.

6. A method according to claim 4 wherein said drawing carriage further includes means for mounting pattern preparation means.

* * * * *

UNITED STATES PATENT AND TRADEMARK OFFICE
CERTIFICATE OF CORRECTION

PATENT NO.  : 4,761,657
DATED       : August 2, 1988
INVENTOR(S) : Bernardo Alcantara Perez et al.

Figure 5:
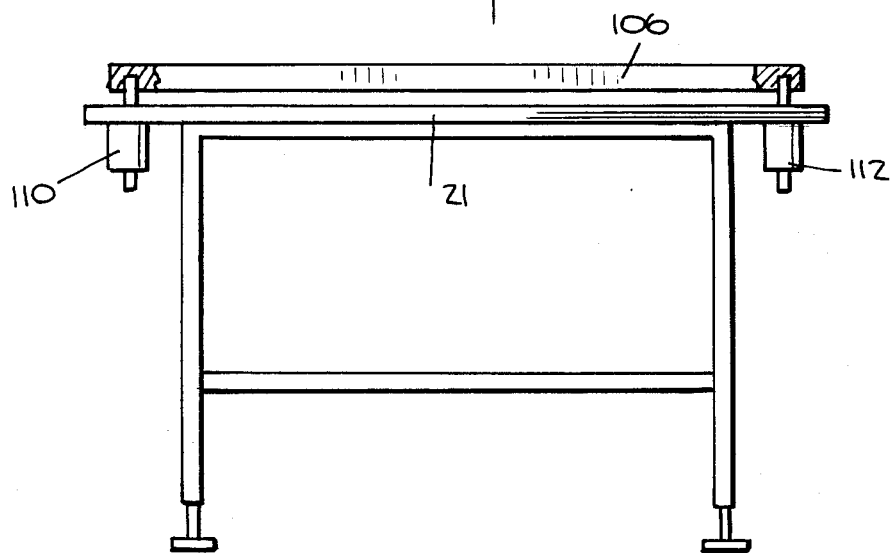
FIG. 5 is a side view of the table of the drawing plotter showing the bars which secure the paper on the table.

It is certified that error appears in the above-identified patent and that said Letters Patent is hereby corrected as shown below:

At Col. 5, line 23, after "electromagnets" insert -- the table. Fig. 5 shows one of the bars 106 and the driving electromagnets --.

Signed and Sealed this

Fifteenth Day of August, 1989

Attest:

DONALD J. QUIGG

*Attesting Officer*   *Commissioner of Patents and Trademarks*